United States Patent
Nevarez et al.

(10) Patent No.: US 10,507,940 B2
(45) Date of Patent: Dec. 17, 2019

(54) MACHINE IN-PLACE TILE THERMAL PROTECTION

(71) Applicant: THE BOEING COMPANY, Chicago, IL (US)

(72) Inventors: Moises Nevarez, Long Beach, CA (US); Robert J. Perez, Huntington Beach, CA (US); Stephanie C. Klimczak, St. Louis, MO (US); Jonathan D. Embler, Tustin, CA (US)

(73) Assignee: THE BOEING COMPANY, Chicago, IL (US)

( * ) Notice: Subject to any disclaimer, the term of this patent is extended or adjusted under 35 U.S.C. 154(b) by 332 days.

(21) Appl. No.: 15/471,993

(22) Filed: Mar. 28, 2017

(65) Prior Publication Data

US 2018/0281996 A1    Oct. 4, 2018

(51) Int. Cl.
| | |
|---|---|
| *B64G 1/58* | (2006.01) |
| *B64C 3/26* | (2006.01) |
| *B64C 1/12* | (2006.01) |
| *B64C 1/40* | (2006.01) |
| *B64G 1/14* | (2006.01) |

(52) U.S. Cl.
CPC ............ *B64G 1/58* (2013.01); *B64C 1/12* (2013.01); *B64C 1/40* (2013.01); *B64C 3/26* (2013.01); *B64G 1/14* (2013.01)

(58) Field of Classification Search
CPC .... B64G 1/58; B64G 1/14; B64C 1/40; B64C 1/12; B64C 3/26
See application file for complete search history.

(56) References Cited

U.S. PATENT DOCUMENTS

| | | | | |
|---|---|---|---|---|
| 3,130,940 A | * | 4/1964 | Erb ......................... | B64G 1/58 165/133 |
| 3,444,033 A | * | 5/1969 | King ..................... | B29C 70/865 109/80 |
| 4,124,732 A | * | 11/1978 | Leger ...................... | B64G 1/58 244/121 |
| 4,155,482 A | * | 5/1979 | Swaney .................. | B63B 25/16 220/560.15 |
| 4,338,368 A | * | 7/1982 | Lovelace ................. | B64G 1/58 156/329 |
| 4,344,591 A | * | 8/1982 | Jackson .................... | B64C 1/38 244/132 |
| 4,686,128 A | * | 8/1987 | Gentilman ................ | B32B 3/30 428/44 |

(Continued)

OTHER PUBLICATIONS

Suppanz et al. "Space Shuttle Orbiter Nose Cap and Wing Leading Edge Certification Test Program", 1980.*

(Continued)

*Primary Examiner* — Assres H Woldemaryam
(74) *Attorney, Agent, or Firm* — Patterson + Sheridan, LLP

(57) ABSTRACT

A method for building an aerodynamic structure, an aerodynamic structure, and a vehicle that includes the aerodynamic structure are provided. The method includes providing a structure with at least one substantially-flat exterior surface. The method also includes attaching blocks of rigid fibrous insulation to the at least one substantially-flat outer surface of the structure. Outward-facing surfaces of the blocks of rigid fibrous insulation extend past a target outer mold line of a final aerodynamic shape. The method also includes machining the outward-facing surfaces of the attached blocks to the outer mold line.

9 Claims, 4 Drawing Sheets

(56) References Cited

U.S. PATENT DOCUMENTS

| | | | | |
|---|---|---|---|---|
| 4,713,275 A * | 12/1987 | Riccitiello | ............... | B64G 1/50 244/117 A |
| 4,804,571 A * | 2/1989 | Jouffreau | ................. | B64G 1/58 244/117 A |
| 5,198,282 A * | 3/1993 | Baker | ...................... | B32B 5/26 257/E39.018 |
| 5,310,592 A * | 5/1994 | Baker | ...................... | B32B 5/26 244/113 |
| H1434 H * | 5/1995 | Cytron | ......................... | 109/49.5 |
| 5,489,074 A * | 2/1996 | Arnold | ..................... | B64G 1/58 244/121 |
| 5,511,747 A * | 4/1996 | Parrot | ...................... | B64G 1/58 244/159.1 |
| 5,639,531 A * | 6/1997 | Chen | ........................ | C04B 35/80 264/125 |
| 6,293,496 B1 * | 9/2001 | Moe | ........................ | B64G 1/58 244/119 |
| 6,489,001 B1 * | 12/2002 | Cazzato | ................... | B64G 1/56 428/121 |
| 6,592,981 B1 * | 7/2003 | Rawal | ..................... | B64G 1/58 244/159.1 |
| 6,770,584 B2 * | 8/2004 | Barney | ................. | C04B 14/064 264/640 |
| 8,844,877 B1 * | 9/2014 | Driemeyer | ................ | B64C 1/38 244/117 A |
| 2005/0084665 A1 * | 4/2005 | DiChiara, Jr. | ...... | B28B 19/0053 428/293.4 |
| 2007/0281565 A1 * | 12/2007 | de Souza | ................ | C04B 30/02 442/172 |
| 2017/0066222 A1 * | 3/2017 | Hynes | .................... | B32B 9/005 |

OTHER PUBLICATIONS

Chapline et al. "Thermal Protection Systems", 2011.*
"WaybackmachinedateforThermalProtectionSystem".*

* cited by examiner

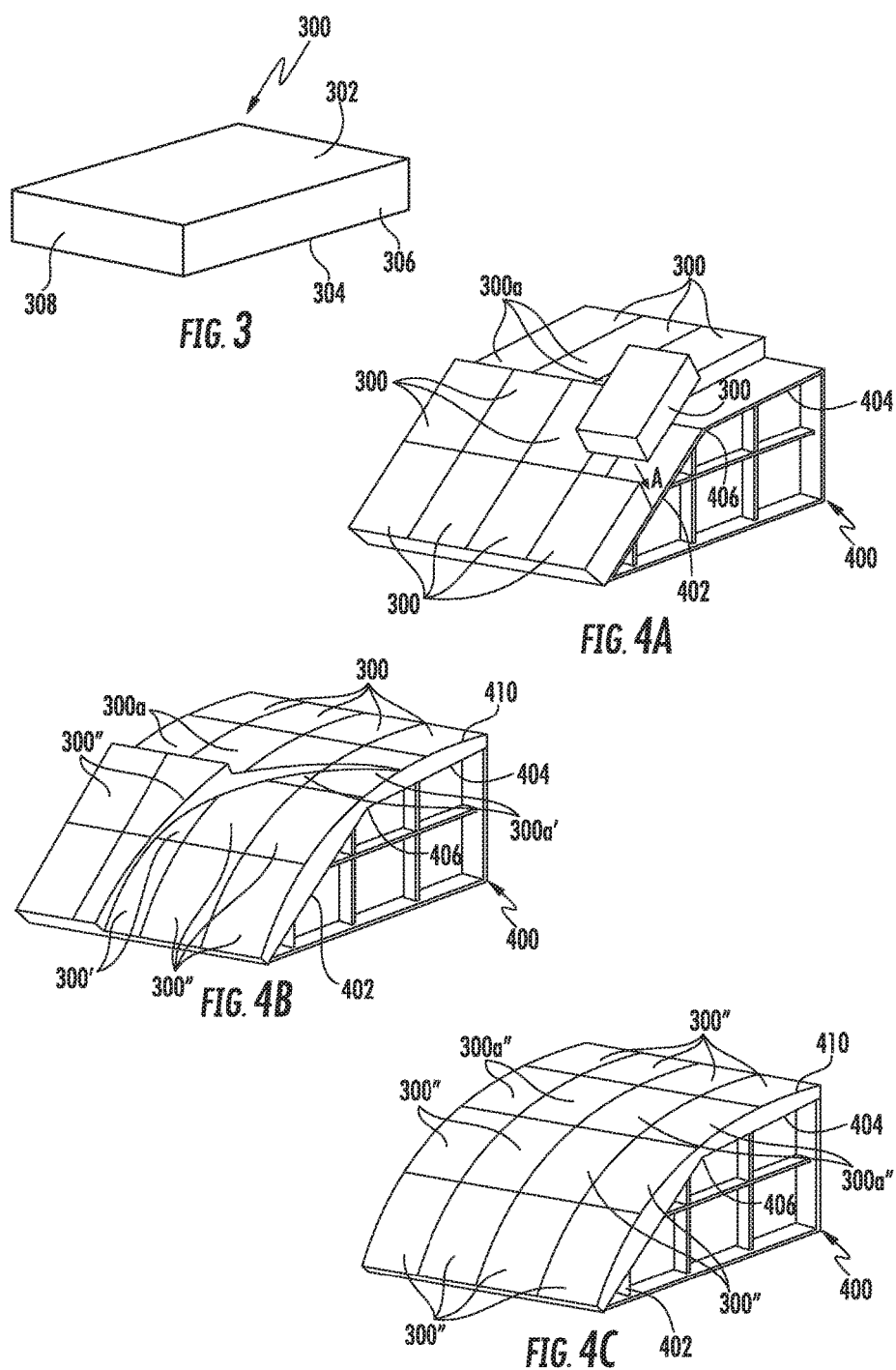

MACHINE IN-PLACE TILE THERMAL PROTECTION

GOVERNMENT RIGHTS

This invention was made with Government support under HR0011-14-9-0005 awarded by DARPA. The government has certain rights in this invention.

BACKGROUND

Aspects described herein relate to thermal protection tiles, and more specifically, to shaping and installing thermal protection tiles.

SUMMARY

According to one aspect, a method for building an aerodynamic structure comprises providing a structure with at least one substantially-flat exterior surface. The method also comprises attaching blocks of rigid fibrous insulation to the at least one substantially-flat exterior surface of the structure. Outward-facing surfaces of the blocks of rigid fibrous insulation extend past an outer mold line of a final aerodynamic shape. The method also comprises machining the outward-facing surfaces of the attached blocks to the outer mold line.

According to one aspect, an aerodynamic surface comprises a structure that comprises a first substantially-flat exterior surface and a second substantially-flat exterior surface. The first and second substantially-flat exterior surfaces intersect at an angle. The aerodynamic surface also comprises a first plurality of blocks of rigid fibrous insulation attached to the first substantially-flat exterior surface. Outward-facing surfaces of the blocks form at least a first portion of an aerodynamic shape. The aerodynamic shape is continuous from an edge of a first one of the first plurality of blocks to an adjacent edge of a second one of the first plurality of blocks. The aerodynamic surface also comprises a second plurality of blocks of rigid fibrous insulation attached to the second substantially-flat exterior surface. One of inward-facing surfaces and sides of the at least one of the second plurality of blocks are in facing relationships with respective sides of at least one of the first plurality of blocks. Exterior surfaces of the second plurality of blocks form at least a second portion of the aerodynamic shape. The aerodynamic shape is continuous from an edge of a first one of the second plurality of blocks to an adjacent edge of a second one of the second plurality of blocks. The aerodynamic shape is continuous from the first plurality of blocks to adjacent ones of the second plurality of blocks.

According to one aspect, a vehicle comprises a structure that comprises a first substantially-flat exterior surface and a second substantially-flat exterior surface. The first and second substantially-flat exterior surfaces intersect at an angle. The vehicle also includes a first plurality of blocks of rigid fibrous insulation attached to the first substantially-flat exterior surface. Outward-facing surfaces of the blocks form at least a first portion of an aerodynamic shape for the vehicle. The aerodynamic shape is continuous from an edge of a first one of the first plurality of blocks to an adjacent edge of a second one of the first plurality of blocks. The vehicle also comprises a second plurality of blocks of rigid fibrous insulation attached to the second substantially-flat exterior surface. One of inward-facing surfaces and sides of the at least one of the second plurality of blocks are in facing relationships with respective sides of at least one of the first plurality of blocks. Exterior surfaces of the second plurality of blocks form at least a second portion of the aerodynamic shape. The aerodynamic shape is continuous from an edge of a first one of the second plurality of blocks to an adjacent edge of a second one of the second plurality of blocks, and wherein the aerodynamic shape is continuous from the first plurality of blocks to adjacent ones of the second plurality of blocks.

BRIEF DESCRIPTION OF ILLUSTRATIONS

FIG. 3 is a perspective view of an exemplary block of rigid fibrous insulation;

FIG. 4A is a perspective view of a structure with blocks of rigid fibrous insulation attached to substantially-flat surfaces of the structure;

FIG. 4B is a perspective view of the structure of FIG. 4A, wherein outward-facing surfaces of some of the blocks of rigid fibrous insulation are machined to an outer mold line defining an aerodynamic surface;

FIG. 4C is a perspective view of the structure of FIG. 4A, wherein outward-facing surfaces of all of the blocks of rigid fibrous insulation are machined to the outer mold line defining the aerodynamic surface;

DETAILED DESCRIPTION

Figure 1:
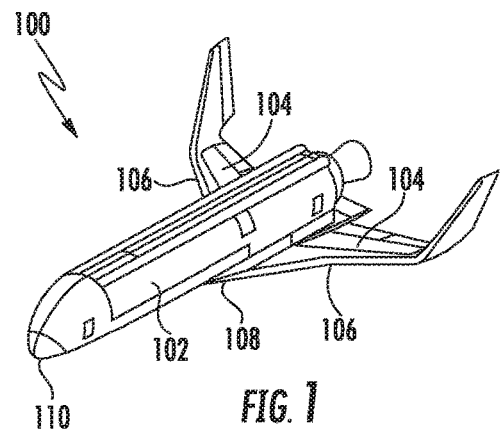
FIG. 1 is a perspective view of the vehicle with ceramic thermal protection tiles arranged thereon, according to at least one aspect.

Spacecraft designed to reenter Earth's orbit and aircraft that travel at very high velocities typically cover exterior portions of the vehicles subject to air friction heating with ceramic thermal protection tiles. The ceramic thermal protection tiles are made of ceramic fibers fused together. The fused together ceramic fibers are referred to herein as "rigid fibrous insulation." In at least one aspect, the rigid fibrous insulation is formed according to the processes described in U.S. Pat. No. 6,716,782, issued on Apr. 6, 2004, the contents of which are incorporated herein in their entirety. The ceramic thermal protection tiles insulate the underlying structure of the vehicle from the heat generated by air friction.

In typical applications, such as on the Space Shuttle or the Boeing X-37 Orbital Test Vehicle, the ceramic thermal protection tiles are installed on exterior surfaces of a vehicle structure that is substantially parallel to an aerodynamic exterior surface profile of the installed tiles (the exterior aerodynamic surface profile of the installed tiles is referred to herein as an outer mold line). As a result, the exterior surfaces of the structure typically include curved surfaces (e.g., at leading edges of airfoils, at wing-to-body fairings, and at the nose cone of the vehicle). The ceramic thermal protection tiles are shaped to fit in relation to each other as well as in relation to the aerodynamically-curved exterior surfaces of the structure. As a result, in many instances, each ceramic thermal protection tile is unique such that it can only be placed in a particular location on the vehicle. The manufacturing costs of making many uniquely-shaped ceramic thermal protection tiles, as well as the costs and logistics of tracking and storing the unique tiles, increases the cost of manufacturing and servicing such vehicles.

Additionally, the ceramic thermal protection tiles are typically installed on a strain isolation pad that is disposed on the exterior surface of the structure for the vehicle. The strain isolation pad may be a heat resistant Nomex felt fabric, or similar material, that cushions the ceramic thermal protection tiles from the exterior surface of the structure. The strain isolation pad allows the vehicle (including the exterior surface of the structure for the vehicle) to flex during the strain of vehicle operations (e.g., lift off, maneuvering, and reentry) without cracking the ceramic thermal protection tiles. One side of the strain isolation pad is typically glued or otherwise adhered to the exterior surface of the structure of the vehicle, and the ceramic thermal protection tiles are glued or otherwise adhered to the other side of the strain isolation pad. The strain isolation pad has a relatively large thickness tolerance. As a result, when the ceramic thermal protection tiles are installed on the strain isolation pad, there can be variations in height from one tile to the next tile, creating discontinuities in the aerodynamic profile of the outer mold line formed by the tiles. Such discontinuities, where an edge of the outward-facing surface of one tile is higher or lower than an adjacent edge of a neighboring tile, can reduce the aerodynamic performance of the vehicle by increasing drag and can increase heating along the surface. In some instances, high spots on certain tiles may be shaved after installation to mitigate some of these discontinuities. However, it may be impossible or impractical to completely eliminate all such discontinuities, and such shaving operations are time consuming and costly.

In aspects disclosed herein, the underlying structure of a vehicle includes flat exterior surfaces that intersect at an angle. Blocks of rigid fibrous insulation with a standardized shape (e.g., a rectangular cuboid or a trapezoidal cuboid) are glued or otherwise adhered to the flat exterior surfaces and/or, optionally, to strain isolation pads on the flat exterior surfaces. After the blocks of rigid fibrous insulation are adhered to the flat exterior surfaces, outward-facing surfaces of the blocks of rigid fibrous insulation are machined to form an outer mold line matching a desired aerodynamic profile. By using blocks of rigid fibrous insulation with standardized shapes, a relatively small number of block shapes may be used to cover the various exterior surfaces of the vehicle, thereby reducing part count and increasing interchangeability among the blocks. In addition, by machining the outward-facing surfaces of the blocks of rigid fibrous insulation after they are attached to the exterior surfaces of the structure of the vehicle, any variation caused by the use of a strain isolation pad may be mitigated. After the outward-facing surfaces of the blocks of rigid fibrous insulation have been machined to the outer mold line, a slurry (e.g., of ceramic powders in a colloidal solution) is applied to the outward-facing surface. The slurry cures at room temperature. In one aspect, room temperature is a temperature within a range between 68° F. and 77° F. In another aspect, room temperature may be within a range of between 60° F. and 100° F. In yet another aspect, room temperature may be within a range of between 60° F. and 90° F. In yet another embodiment, room temperature may be any temperature below temperatures that would cause damage and/or deformation to the structure on which blocks of rigid fibrous materials are attached or to other components attached to the structure. The cured slurry increases the hardness of the outward-facing surfaces of the blocks of rigid fibrous insulation, increases the impact protection of the blocks of rigid fibrous insulation, and improves the thermal emissivity of the blocks of rigid fibrous insulation. The blocks of rigid fibrous insulation with the cured slurry are ceramic thermal protection tiles. Since the slurry is applied after the blocks of rigid fibrous insulation after outward-facing surfaces of the blocks are machined to the outer mold line, the resulting ceramic thermal protection tiles may be uniformly coated with the cured slurry. By contrast, the above-described "shaving" of high spots on ceramic thermal protection tiles that are machined prior to installation on a structure may have a non-uniform coating due to this coating spots or dissimilar coatings applied at the shaving locations.

FIG. 1 is a perspective view of a spacecraft 100 that includes a fuselage 102, a nose cone 110, and wings 104. The wings 104 include leading edges 106, and the wings 104 are attached to the fuselage 102 with a wing-to-body fairing 108. The nose cone 110, the leading edges 106 of the wings 104, and the wing to body fairing 108 may all be subject to high temperatures due to air friction when the spacecraft 100 reenters the atmosphere. The nose cone 110, the leading edges 106 of the wings 104, and the wing-to-body fairing 108 are covered in ceramic thermal protection tiles, which insulate the underlying structure of the spacecraft 100 from the heat.

Figure 2:
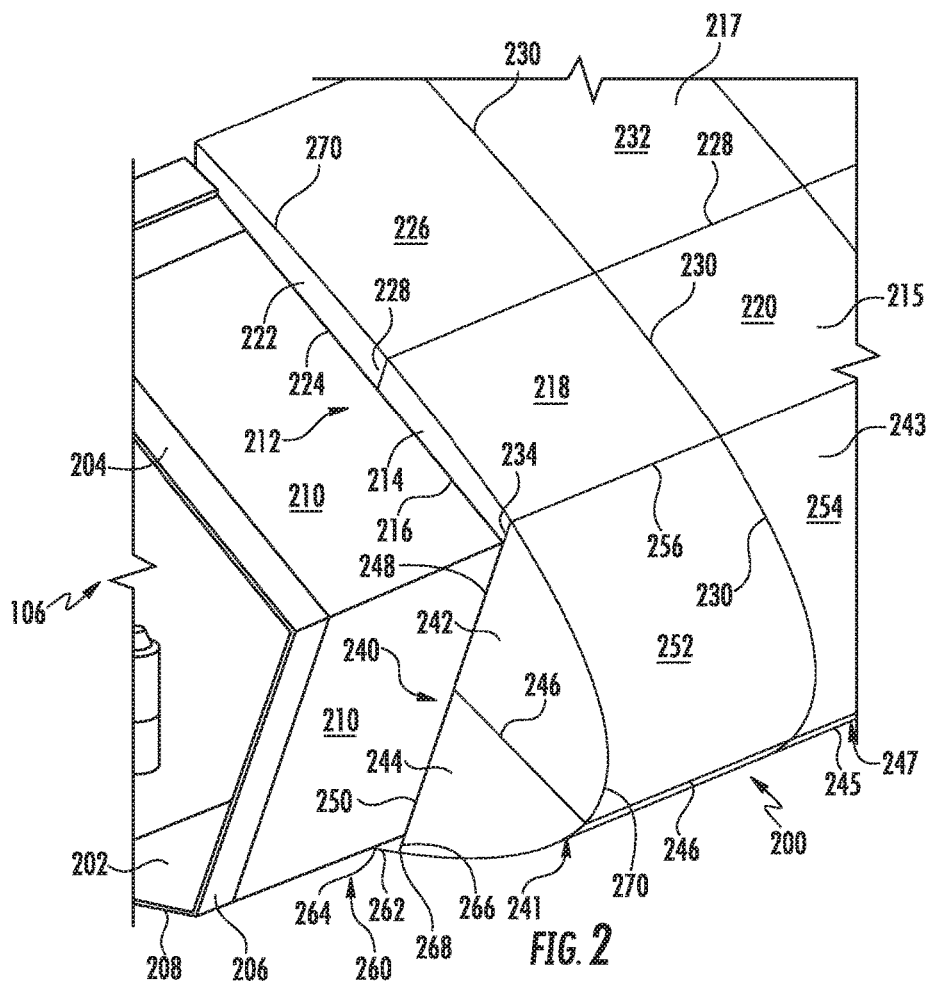
FIG. 2 is a perspective, cross-sectional view of a leading edge of the vehicle of FIG. 1.

FIG. 2 is a perspective cross-sectional view of an aerodynamic surface 200 for a vehicle, such as the spacecraft 100. For example, the aerodynamic surface 200 could be a portion of the leading edge 106 of one of the wings 104 of the spacecraft 100, according to one aspect. The aerodynamic surface 200 includes a structure 202 that comprises a first substantially-flat exterior surface 204 and a second substantially-flat exterior surface 206. The first substantially-flat exterior surface 204 and the second substantially-flat exterior surface 206 intersect at an angle. The illustrated structure 202 includes a third substantially-flat exterior surface 208, which intersects with the second substantially-flat exterior surface 206 at an angle. In various aspects, a structure could have more than three substantially-flat exterior surfaces. In at least one aspect, the substantially-flat exterior surfaces could form a faceted shape.

In the illustrated aspect, the first substantially-flat exterior surface 204 and the second substantially-flat exterior surface 206 are covered with a strain isolation pad 210. As discussed above, the strain isolation pad 210 may be glued or otherwise adhered to the first substantially-flat exterior surface 204 and the second substantially-flat exterior surface 206. The term "substantially-flat" refers to a surface that is flat but for manufacturing tolerances and/or part tolerances. For example, as discussed above, strain isolation pads 210 typically have a relatively high thickness variance. If such a strain isolation pad 210 were placed on a flat surface, the outward-facing surface of the strain isolation pad 210 would be considered a "substantially-flat" surface because any waviness to the outward-facing surface of the strain isolation pad 210 would be due to the part tolerances of the strain isolation pad 210.

A first plurality of blocks of rigid fibrous insulation 212 are attached to the first substantially-flat exterior surface 204. As discussed above, the first plurality of blocks of rigid fibrous insulation 212 are glued or otherwise adhered to the first substantially-flat exterior surface 204. In at least one aspect, the adhesive is a room temperature vulcanizing (RTV) silicone. In at least one aspect, the RTV silicone is a two-part RTV silicone adhesive optimized for performance at elevated temperatures by adding fillers such as iron oxide. In aspects in which the first substantially-flat exterior surface 204 is covered with the strain isolation pad 210, the first plurality of blocks of rigid fibrous insulation 212 are glued or otherwise adhered to the strain isolation pad 210. In one aspect, the blocks of rigid fibrous insulation 212 are bonded to the strain isolation pad 210 before the strain isolation pad 210 is bonded to the first substantially-flat exterior surface 204. In another aspect, the strain isolation pad 210 is bonded to the first substantially-flat exterior surface 204 and then the blocks of rigid fibrous insulation 212 are bonded to the strain isolation pad 210.

As discussed above, the first plurality of blocks of rigid fibrous insulation 212 are made of ceramic fibers fused together. In at least one aspect, the ceramic fibers fused together resemble a bird's nest (if viewed through a microscope) or other porous structure. An adhesive applied to such a porous structure may be absorbed into the structure rather than stay on the surface of the blocks, thereby reducing the effectiveness of the adhesive when applied to the first substantially-flat exterior surface 204 and/or the strain isolation pad 210. To mitigate absorption of the adhesive into the structure, a slurry is applied to the inward-facing surfaces of the first plurality of blocks of rigid fibrous insulation 212 (e.g., inward-facing surface 216 of block 214 and inward-facing surface 224 of block 222). In one aspect, the slurry includes one or more types of ceramic powders in a colloidal solution. The colloidal solution may be an alcohol, water, or other liquid with oppositely charged polymers that adhere to particles of the ceramics. In one aspect, the slurry comprises between 60-80% colloidal silica solution, 20-40% silica powder, and 0-4% Silicon Hexaboride, by weight. The oppositely charged polymers prevent agglomeration of the ceramic particles. The coating may be cured at room temperature or at elevated temperatures (e.g., during firing in an autoclave or oven). In one aspect, the cured coating penetrates approximately one tenth of an inch into the surface of the blocks of rigid fibrous insulation, densifying the outermost one tenth of an inch of the blocks. Stated differently, the cured coating makes the inward-facing surfaces of the blocks of rigid fibrous insulation impermeable such that an adhesive applied to the inward-facing surfaces of the blocks remains on the surface. Additionally, the cured coatings strengthen the tiles and distributing the loads imparted at the interface between the blocks of rigid fibrous insulation 212 and the strain isolation pad 210.

As shown in FIG. 2, the first plurality of blocks of rigid fibrous insulation 212 is attached to the first substantially-flat exterior surface 204 (or the strain isolation pad 210). The first plurality of blocks of rigid fibrous insulation 212 is arranged on the first substantially-flat exterior surface 204 with gaps 228 and 230 therebetween. In one aspect, the gaps between blocks is between 0.01 and 0.20 inches. For example, blocks 214 and 215 of the first plurality of blocks of rigid fibrous insulation 212 are separated from blocks 222 and 217 of the first plurality of blocks of rigid fibrous insulation 212 by a gap 228. Additionally, blocks 214 and 222 of the first plurality of blocks of rigid fibrous insulation 212 are separated from blocks 215 and 217 by the gap 230.

In FIG. 2, the blocks of the first plurality of blocks of rigid fibrous insulation 212 have been machined to an outer mold line 270 such that the outward-facing surfaces of the blocks of rigid fibrous insulation form a continuous aerodynamic shape from one block to the next. For example, the aerodynamic shape defined by the outward-facing surface 218 of block 214 continues along the outward-facing surface 226 of block 222 across the gap 228. Stated differently, the edge of the outward-facing surface 218 of block 214 to the adjacent edge of the outward-facing surface 226 of block 222 both lay on the outer mold line 270. As another example, the aerodynamic shape defined by the outward-facing surface 218 of block 214 continues along the outward-facing surface 220 of block 215 across the gap 230. The outer mold line 270 defines the aerodynamic shape of the outward-facing surfaces of the blocks of rigid fibrous material in all three dimensions (i.e., front-to-back relative to the spacecraft 100, top-to-bottom relative to the spacecraft 100, and side-to-side relative to the spacecraft 100).

FIG. 2 also shows a second plurality of blocks of rigid fibrous insulation 240 attached to the second substantially-flat exterior surface 206 (and/or to the strain isolation pad 210). For example, FIG. 2 shows blocks 242, 244, 243, and 245 of the second plurality of blocks of rigid fibrous insulation 240 attached to the second substantially-flat exterior surface 206 and/or to the strain isolation pad 210. As shown in the partial cross-sectional view, inward-facing surfaces 248 and 250 of blocks 242 and 244, respectively, are attached to the strain isolation pad 210 (e.g., with glue or other adhesive). Additionally, the inward-facing surfaces 248 and 250 extend past the edges of the second substantially-flat exterior surface 206 (where the second substantially-flat exterior surface 206 intersects the first substantially-flat exterior surface 204 and the third substantially-flat exterior surface 208, respectively). As a result, the inward-facing surface 248 of the block 242 is arranged in a facing relationship with a side surface 234 of the block 214 from the first plurality of blocks of rigid fibrous insulation 212. A gap 256 is formed between the inward-facing surface 248 of the block 242 and the side surface 234 of the block 214. Similarly, the inward-facing surface 250 of the block 244 is arranged in a facing relationship with a side surface 266 of a block 262 from a third plurality of blocks of rigid fibrous insulation 260 attached to the third substantially-flat exterior surface 208. A gap 268 is formed between the inward-facing surface 250 of the block 244 and the side surface 266 of the block 262.

The second plurality of blocks of rigid fibrous insulation 240 is arranged on the second substantially-flat exterior surface 206 with gaps 246 and 230 therebetween. For example, the block 242 and the block 244 of the second plurality of blocks of rigid fibrous insulation 240 are separated by a gap 246. Additionally, the block 243 of the second plurality of blocks of rigid fibrous insulation 240 is separated from the block 242 by the gap 230. As shown in the exemplary aspect of FIG. 2, the blocks of the first plurality of blocks of rigid fibrous insulation 212 and the second plurality of blocks of rigid fibrous insulation 240 are aligned such that the gap 230 is continuous from the first plurality to the second plurality. In various other aspects, the first plurality of blocks of rigid fibrous insulation 212 and the second plurality of blocks of rigid fibrous insulation 240 may not be aligned such that the gap 230 would be positioned differently in the first plurality of blocks of rigid fibrous insulation 212 and the second plurality of blocks of rigid fibrous insulation 240.

In FIG. 2, the blocks of the second plurality of blocks of rigid fibrous insulation 240 have been machined to the outer mold line 270 such that the outward-facing surfaces of the blocks of rigid fibrous insulation form a continuous aerodynamic shape from one block to the next. For example, the aerodynamic shape defined by the outward-facing surface 252 of block 242 continues along the outward-facing surface 241 of block 244 across the gap 246. Stated differently, the edge of the outward-facing surface 252 of block 242 and the adjacent edge of the outward-facing surface 241 of block 244 lay along the outer mold line 270. As another example, the aerodynamic shape defined by the outward-facing surface 252 of the block 242 continues along the outward-facing surface 254 of the block 243 across the gap 230. Moreover, the aerodynamic shape defined by the outward-facing surfaces of the blocks is continuous from the blocks of the first plurality of blocks of rigid fibrous insulation 212 to the blocks of the second plurality of blocks of rigid fibrous insulation 240. For example, the aerodynamic shape defined by the outward-facing surface 252 of block 242 continues along the outward-facing surface 218 of block 214 across the gap 256. Likewise, the aerodynamic shape defined by the outward-facing surface 254 of block 243 continues along the outward-facing surface 220 of block 215 across the gap 256. Similarly, the aerodynamic shape defined by the outward-facing surfaces of the blocks is continuous from the blocks of the second plurality of blocks of rigid fibrous insulation 240 to the blocks of the third plurality of blocks of rigid fibrous insulation 260. For example, the aerodynamic shape defined by the outward-facing surface 241 of block 244 continues along the outward-facing surface 264 of block 262 across the gap 268.

FIG. 3 illustrates an exemplary block of rigid fibrous insulation 300 prior to installation onto a substantially-flat structure and prior to machining of an outward-facing surface to an outer mold line defining aerodynamic surface. For example, the illustrated block of rigid fibrous insulation 300 could be attached to the substantially-flat exterior surfaces 204, 206, and 208 of the structure 202 to form the first, second, and third pluralities of blocks of rigid fibrous insulation 212, 240, and 260. Thereafter, outward-facing surfaces of the blocks of rigid fibrous insulation 300 could be machined to the outer mold line 270 to shape the first, second, and third pluralities of blocks of rigid fibrous insulation 212, 240, and 260 as illustrated in FIG. 2. The exemplary block of rigid fibrous insulation 300 has a rectangular cuboid shape, meaning that an inward-facing surface 302 and an outward-facing surface 304 are parallel to each other, and that sidewalls 306 and 308 extending between the inward-facing surface 302 and the outward-facing surface 304 are perpendicular to the inward-facing surface 302, to the outward-facing surface 304, and to each other. The block 300 may be a general block used for covering most of the flat surfaces of a structure. Where two flat or substantially-flat surfaces of the structure intersect at an angle, the block 300 may be modified to provide a block with surfaces specific for an intersection of blocks at that angle. For example, one or both of the sidewalls 306 and 308 could be arranged at a non-perpendicular angle relative to the inward-facing surface 302, the outward-facing surface 304, and/or each other. Such modifications to the block 300 could be performed by machining the block 300 (e.g., using a computer numerical control (CNC) mill) or by modifying a mold for forming the block 300. Additionally, blocks 300 could be modified such that the inward-facing surface 302 and/or the outward-facing surface 304 has a non-rectangular shape for placement along an edge of a substantially-flat surface that is not linear or that will not align with edges of the unmodified block 300.

In one aspect, the blocks of rigid fibrous insulation 300 are formed from a combination of silica ($SiO_2$) and alumina ($Al_2O_3$) fibers, and boron-containing power (e.g., Boron Carbide) that are used as a sintering agent. The insulative material is composed of about 60 wt % to about 80 wt % silica fibers, about 20 wt % to about 40 wt % alumina fibers, and about 0.1 wt % to about 1.0 wt % boron-containing powder. During processing, the boron-containing powder provides boron-containing by-products which fuse and sinter the silica and alumina fibers when heated to elevated temperatures. Thus, no supplemental binder is required during production of the insulative material. The use of the boron-containing powder allows the use of lower amounts (relative to Nextel fibers used in AETB production) to form sufficient sintering between the fibers. This small amount of boron-containing powder is replacing a relatively large amount of Nextel fibers (12 to 15 wt %), which is one of the high cost components and is found to provide adverse effects on the thermal conductivity due to its larger diameter.

The tile material is produced by dispersing the ceramic fibers in an aqueous solution forming a slurry. The slurry is blended using the shear mixer, which disperses the fibers evenly throughout and chops them to a certain length. By using a shear mixer, the fibers tend to be oriented lengthwise in the direction of the radial flow of the slurry during mixing. In the finished tile, the fibers are substantially oriented in the direction perpendicular to the press direction of the slurry, making this material anisotropic. This arrangement of fibers results in much lower thermal conductivity along the press direction (through-the-thickness) relative to the direction perpendicular to the press direction (in-plane).

After mixing and chopping, the slurry is optionally classified through a separation means in order to remove undesirable solids, known as inclusions or shot, from the fiber slurry suspension. The insulative characteristic of the material stems from having small diameter ceramic fibers surrounded by large volumes of air. High-density ceramic shot or clumps are detrimental to the effectiveness of the insulation properties, and are therefore removed before the material is pressed.

After filtration of the shot and/or clumps, the slurry is pumped into the mold, otherwise known as the casting box, from which the fibers are drained and pressed. Water removal is accomplished via gravity drain through the porous bottom of the casting box. Acceleration of the draining step is done by the application of a vacuum at the bottom of the casting box. The slurry is pressed to produce a wet billet of ceramic fiber. The slurry is preferably pressed in the vertical direction, by moving a top surface downwards and pressing upon the fibers. The vertical press direction is also called "through-the-thickness" direction. The geometry of the top surface, otherwise known as the press plate, is preferably similar to that of the billet to reduce, if not eliminate, fiber layer separation caused by surface friction with the inner walls of the casting box.

After pressing, the wet billet is dried and fired. The drying step removes residual moisture from the billet. The firing step fuses the fibers to one another to produce a rigid body and to provide structural integrity. Drying occurs at approximately 200 to 500° F. for at least 24 hours. Firing occurs at a temperature between about 2,300° F. and about 2,600° F. for about 1 to about 5 hours.

The fused insulative material is machined into the shape of a tile, normally in the six-inch by six-inch planform and with thickness ranging from one to three inches. The tile is machined so that the top surface and the bottom surface of the tile are roughly parallel to the direction of the fiber alignment within the tile material. This arrangement provides an increase in tensile strength in the in-plane direction, which prevents the shrinkage and slumping that is problematic in the older generation tiles. For example, tensile strength of a new tile having a bulk density of 8 lbs/ft$^3$ is approximately 110-140 lbs/in$^2$ in the in-plane direction and approximately 35-55 lbs/in$^2$ in the through-the-thickness direction. The direction is termed as "in-plane" when it is perpendicular to the fiber press direction, while "through-the-thickness" direction is termed when it is parallel to the fiber press direction. The strength of the tile is sufficient to support a coating (e.g., a room-temperature curing slurry) applied on the outer surface of the tile without problems associated with slumping.

The insulative material exhibits very low thermal conductivity, particularly in the through-the-thickness direction.

FIGS. 4A-4C illustrate steps for attaching blocks of rigid fibrous insulation (e.g., blocks 300) on a structure 400 and then machining the blocks of rigid fibrous insulation to an outer mold line defining an aerodynamic shape. The exemplary structure 400 and outer mold line of the aerodynamic shape illustrated in FIGS. 4A-4C is different from the structure 202 and outer mold line 270 of the aerodynamic shape illustrated in FIG. 2. Therefore, the blocks 300 of rigid fibrous insulation may be attached to the structure 400 in a different arrangement and/or outward-facing surfaces of the blocks 300 of rigid fibrous insulation may be machined differently to form the different outer mold line. FIG. 4A illustrates a structure 400 that includes a first substantially-flat exterior surface 402 and a second substantially-flat exterior surface 404 meet at an angle at a line of intersection 406. As shown in FIG. 4A, seven blocks 300 of rigid fibrous insulation have been attached to the first substantially-flat exterior surface 402 of the structure 400, and an eighth block 300 of rigid fibrous insulation is being attached to the first substantially-flat exterior surface 402 of the structure 400 (as indicated by arrow A). As discussed above, prior to attaching the blocks 300 to the first substantially-flat exterior surface 402, the inward-facing surfaces 302 of the blocks 300 have been coated with a slurry, and the slurry has been cured. Additional blocks 300 of rigid fibrous insulation have been attached to the second substantially-flat exterior surface 404 of the structure 400. As shown best in FIGS. 4B and 4C, the second substantially-flat exterior surface 404 includes modified blocks 300a disposed along the line of intersection 406 that have a side surface arranged at a non-orthogonal angle relative to the inward-facing surface 302 and the outward-facing surface 304. The non-orthogonal side surfaces of the modified blocks 300a are arranged at an angle such that the non-orthogonal side surfaces of the modified blocks 300a are arranged in a parallel facing relationship with the orthogonal side surfaces of the blocks 300 attached to the first substantially-flat exterior surface 402 and disposed along the line of intersection 406. As shown in FIG. 4A, the structure is covered by two types of blocks 300 and 300a. Thus, for this exemplary structure, only two types of blocks kept in inventory.

Referring now to FIG. 4B, after the blocks 300 and modified blocks 300a are attached to the first substantially-flat exterior surface 402 and the second substantially-flat exterior surface 404 of the structure 400, outward-facing surfaces of the blocks 300 and 300a are machined to an outer mold line 410 that defines an aerodynamic surface. For example, the structure 400, with the blocks 300 and 300a attached, may be placed in a CNC mill, which follows a computer program to use a cutting head to mechanically remove material from the outward-facing surfaces of the blocks 300 and 300a. As another example, an etching agent may be selectively applied to chemically remove material from the outward-facing surfaces of the blocks 300 and 300a. In yet another example, a laser or other radiation source may be applied to ablate the outward-facing surfaces of the blocks 300 and 300a. In FIG. 4B, certain ones of the blocks 300' and 300a' have been partially machined to the outer mold line 410, certain others of the blocks 300" have been fully machined to the outer mold line 410, and the remainder of the blocks 300 and 300a have not been machined yet. In FIG. 4C, all of the blocks 300" and 300a" have been fully machined to the outer mold line 410 that defines a desired aerodynamic shape.

After the blocks 300 and 300a have been machined to the mold line defining the desired aerodynamic shape, the outward-facing surfaces of the blocks 300 and 300a are coated with a slurry (e.g., ceramic powders in a colloidal solution). In one aspect, the slurry comprises about 60-80% colloidal silica solution, 20-40% silica powder, and 1-5% silicon hexaboride. The slurry may be sprayed on or brushed on. In at least one aspect, gaps between adjacent blocks 300 and 300a are covered prior to applying the coating such that the slurry does not fill in the gaps. Here, the slurry cures at room temperature. The cured slurry densifies the outward-facing surface of the blocks 300 and 300a, improving rigidity, impact protection, and thermal emissivity of the outward-facing surfaces of the blocks 300 and 300a. After the coating has cured, the blocks 300 and 300a of rigid fibrous insulation are ceramic thermal protection tiles for the structure 400.

Figure 5A:
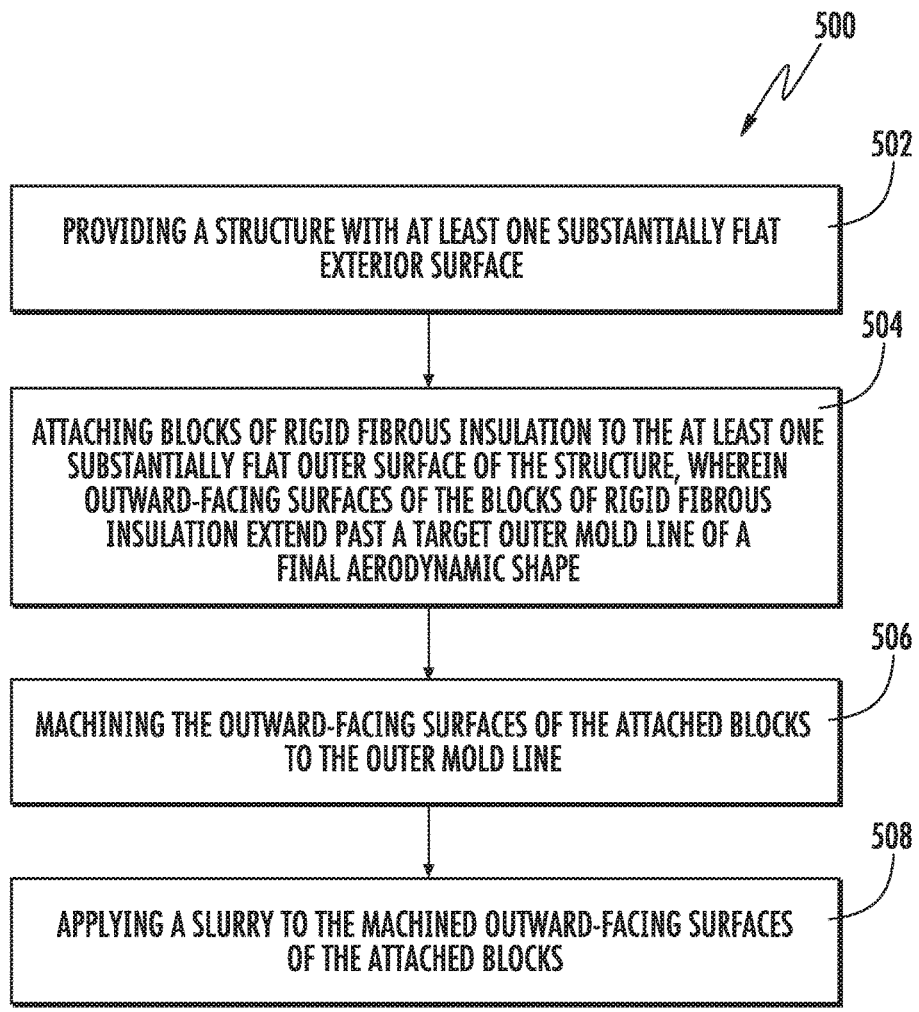
FIG. 5A is a flowchart for a method for forming ceramic thermal protection tiles on a structure having a substantially-flat exterior surface.

FIG. 5A is a flow chart for a method 500 of providing ceramic thermal protection tiles on a structure. In block 502 of the method 500, a structure is provided with at least one substantially-flat outer surface. In block 504 of the method 500, blocks of rigid fibrous insulation are attached to the at least one substantially-flat outer surface of the structure. Outward-facing surfaces of the blocks of rigid fibrous insulation extend past a target outer mold line of a final aerodynamic shape for the structure. In block 506 of the method 500, the outward-facing surfaces of the attached blocks are machined to the outer mold line to form the aerodynamic shape. In block 508 of the method 500, a slurry is applied to the machined exterior surfaces of the attached blocks. The slurry cures at room temperature. Once the slurry cures, the blocks of fibrous rigid insulation are ceramic thermal protection tiles on the surface of the structure.

Figure 5B:
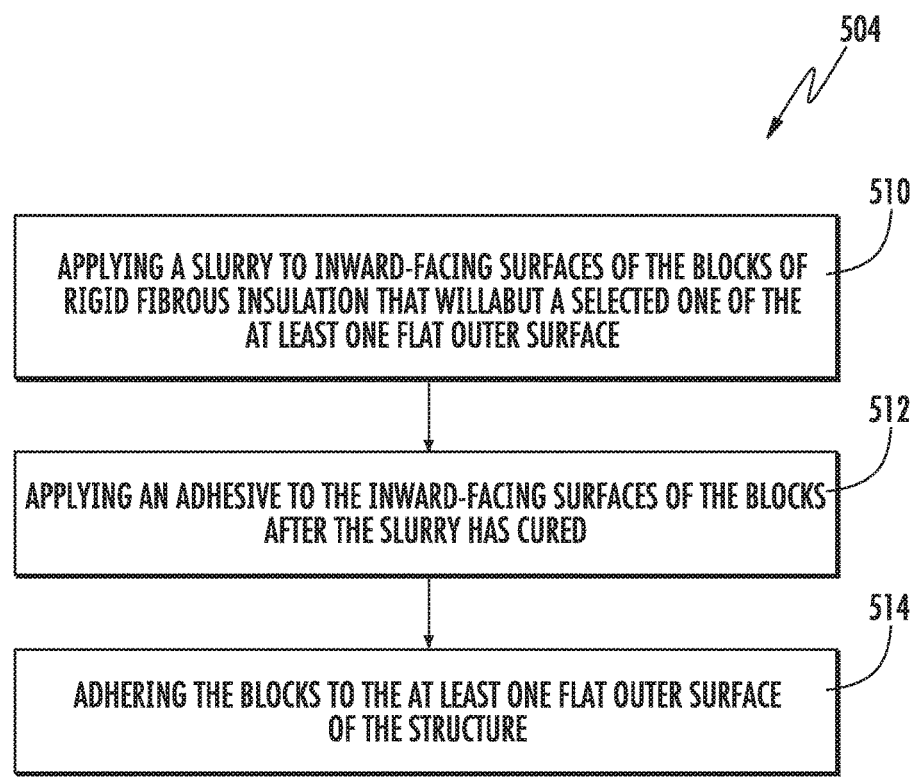
FIG. 5B is a flow chart for the step from the method of FIG. 5A of attaching blocks of rigid fibrous insulation to a substantially-flat surface of the structure.

FIG. 5B is a flow chart for block 504 of the method 500. In block 510, a slurry is applied to inward-facing surfaces of the blocks of rigid fibrous insulation that will abut a selected one of the at least one flat outer surface. After the slurry or coating has cured (at room temperature or after the application of heat, according to the composition of the slurry), an adhesive is applied to the inward-facing surfaces of the blocks. In block 514, the blocks are adhered to the at least one flat outer surface of the structure.

In the above-described aspects, ceramic thermal protection tiles may be arranged on a structure in a manner that is less expensive and less time-consuming than previous methods for arranging tiles, in which individual tiles are custom shaped to fit into a particular location. Moreover, in the above-described aspects, the ceramic thermal protection tiles are formed such that outward-facing surfaces of the ceramic thermal protection tiles form a continuous aerodynamic surface, which is more aerodynamic than the previous methods for arranging tiles, which commonly result in aerodynamic discontinuities.

The above-described aspects for forming ceramic thermal protection tiles have been described with reference to aerodynamic surfaces of an aircraft or spacecraft. In various other aspects, the methods described above could be used to form ceramic thermal protection tiles for other applications, such as for a furnace.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. An aerodynamic surface, comprising:
    a structure that comprises a first substantially-flat exterior surface and a second substantially-flat exterior surface, wherein the first and second substantially-flat exterior surfaces intersect at an angle; and
    a first plurality of blocks of rigid fibrous insulation attached to the first substantially-flat exterior surface, wherein outward-facing surfaces of the blocks form at least a first portion of an aerodynamic shape, and wherein the aerodynamic shape is continuous from an edge of a first one of the first plurality of blocks to an adjacent edge of a second one of the first plurality of blocks; and
    a second plurality of blocks of rigid fibrous insulation attached to the second substantially-flat exterior surface, wherein one of inward-facing surfaces and sides of the at least one of the second plurality of blocks are in facing relationships with respective sides of at least one of the first plurality of blocks, wherein outward-facing surfaces of the second plurality of blocks form at least a second portion of the aerodynamic shape, wherein the aerodynamic shape is continuous from an edge of a first one of the second plurality of blocks to an adjacent edge of a second one of the second plurality of blocks, and wherein the aerodynamic shape is continuous from the first plurality of blocks to adjacent ones of the second plurality of blocks.

2. The aerodynamic surface of claim 1, wherein outward-facing surfaces of the plurality of blocks are uniformly coated with a cured slurry, wherein the cured slurry comprises ceramic particles suspended in a colloidal solution.

3. The aerodynamic surface of claim 1, wherein the first substantially-flat exterior surface comprises a strain isolation pad, and wherein the plurality of blocks of rigid fibrous insulation are attached to the strain isolation pad.

4. The aerodynamic surface of claim 1, wherein the aerodynamic shape forms at least a portion of a leading edge of an airfoil.

5. The aerodynamic surface of claim 1, wherein the aerodynamic shape forms at least a portion of a nose cone of a fuselage.

6. The aerodynamic surface of claim 1, wherein the aerodynamic surface forms at least a portion of a wing-to-body fairing for a vehicle.

7. A vehicle, comprising:
    a structure that comprises a first substantially-flat exterior surface and a second substantially-flat exterior surface, wherein the first and second substantially-flat exterior surfaces intersect at an angle;
    a first plurality of blocks of rigid fibrous insulation attached to the first substantially-flat exterior surface, wherein outward-facing surfaces of the blocks form at least a first portion of an aerodynamic shape for the vehicle, and wherein the aerodynamic shape is continuous from an edge of a first one of the first plurality of blocks to an adjacent edge of a second one of the first plurality of blocks; and
    a second plurality of blocks of rigid fibrous insulation attached to the second substantially-flat exterior surface, wherein one of inward-facing surfaces and sides of the at least one of the second plurality of blocks are in facing relationships with respective sides of at least one of the first plurality of blocks, wherein outward-facing surfaces of the second plurality of blocks form at least a second portion of the aerodynamic shape, wherein the aerodynamic shape is continuous from an edge of a first one of the second plurality of blocks to an adjacent edge of a second one of the second plurality of blocks, and wherein the aerodynamic shape is continuous from the first plurality of blocks to adjacent ones of the second plurality of blocks.

8. The vehicle of claim 7, wherein outward-facing surfaces of the plurality of blocks are uniformly coated with cured slurry, wherein the cured slurry comprises ceramic particles suspended in a colloidal solution.

9. The vehicle of claim 7, wherein the aerodynamic shape forms at least a portion of a wing for the vehicle.

* * * * *